Figure 1:
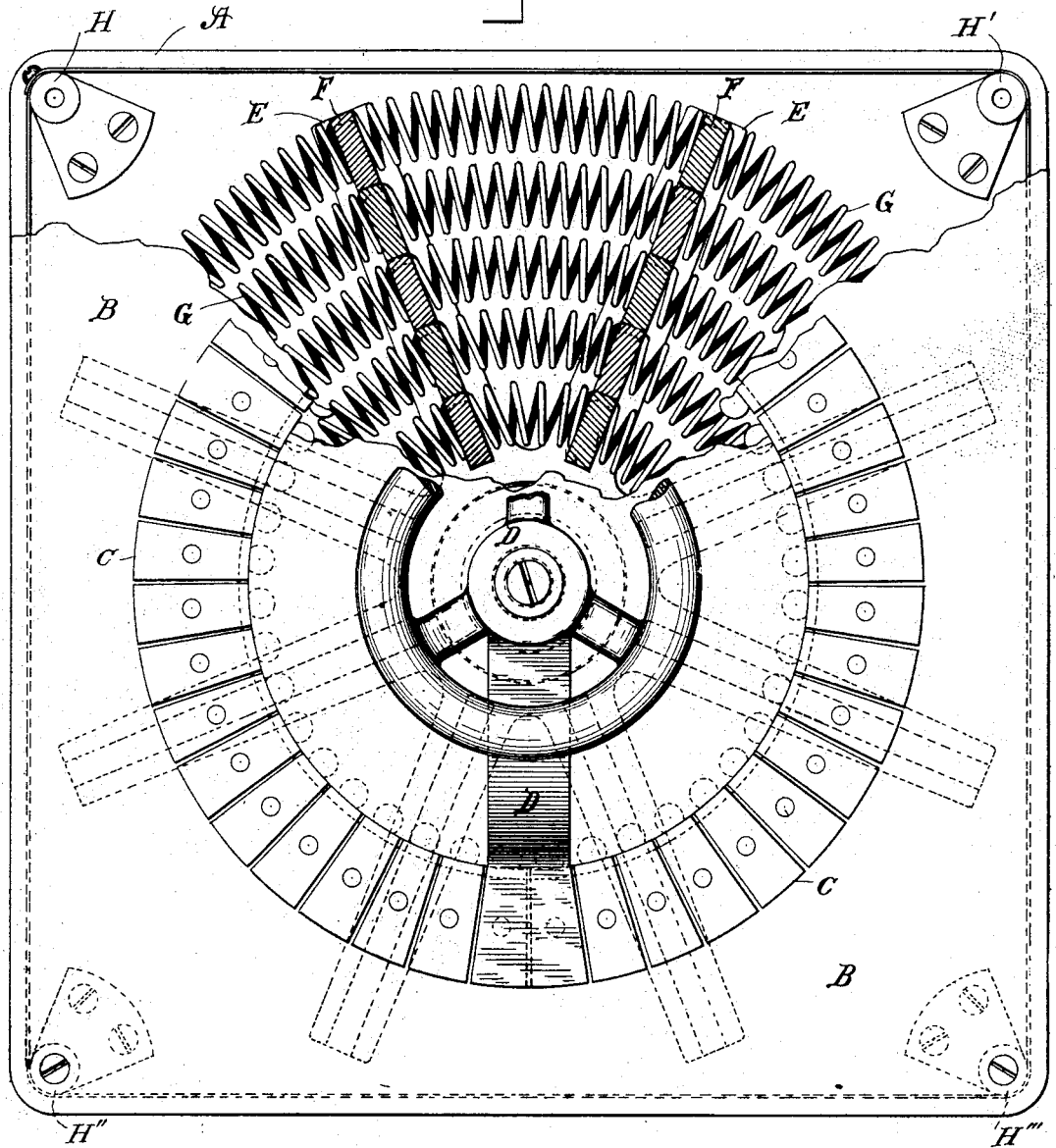

(No Model.)  F. A. WELLER.  2 Sheets—Sheet 1.
RHEOSTAT.

No. 511,259.  Patented Dec. 19, 1893.

Witnesses.
John F. Nelson
Nellie A. Morgan

Inventor.
Franklin A. Weller (No Model.) 2 Sheets—Sheet 2.

F. A. WELLER.
RHEOSTAT.

No. 511,259. Patented Dec. 19, 1893.

Witnesses.
John F. Nelson,
Nellie A. Morgan,

Inventor.
Franklin A. Weller

UNITED STATES PATENT OFFICE.

FRANKLIN A. WELLER, OF BOSTON, MASSACHUSETTS.

RHEOSTAT.

SPECIFICATION forming part of Letters Patent No. 511,259, dated December 19, 1893.

Application filed April 20, 1892. Serial No. 429,927. (No model.)

*To all whom it may concern:*

Be it known that I, FRANKLIN A. WELLER, a citizen of the United States, residing in the city of Boston, county of Suffolk, Commonwealth of Massachusetts, have invented an improved form of rheostat or resistance-box, suitable for regulating the amount of current flowing through the circuit in which it is interposed, and designed for especial use in connection with dynamos, electrical machines, or electric motors, of which the following is a specification.

The object of my invention is to simplify the construction of a rheostat, or resistance box, by providing means whereby the resistance conductor may be arranged in a small compartment suitably ventilated. I have arranged for supporting the resistance conductors at short intervals, so as to obviate the danger of the various convolutions of the conductor coming in electrical contact with each other.

In general terms, my invention provides for a rheostat, or resistance box, provided with supports arranged around a central hub, so as to permit the disposition of the resistance conductor circumferentially around it; the hub being provided with radial arms that are grooved so as to retain in position strips of hard insulating material such as glass, slate or porcelain. I prefer to wind the resistance conductor in form of a spiral, and then lay it off in the desired number of divisions, at which point I unite leads that are connected to the contact plates, upon which travels the resilient arm which is electrically connected to one of the terminals of the source of current that is to be controlled. It is obvious that the total length of the resistance conductor may be divided into any desired number of equal or unequal parts, and that the leads may be electrically united to the resistance conductor before the spiral is arranged around the central hub; and it also follows that by changing the length or width of the insulating bar, or supports, and correspondingly lengthening the central hub, or radial arm, the capacity of the rheostat may be increased. The hub, upon which is supported the portion forming the grooved radial arms, is mounted upon a plate of either metal, or non-combustible material, to which are attached supports, or standards of suitable length for retaining the upper plate, to which is fastened the segmental circle, the segments of which are arranged upon a plate of hard insulating material such as wood, fiber or slate. Then the resistance conductor between the lower and upper plates, is inclosed by means of a perforated piece of sheet iron, or wire screen.

I attain the object of my invention by first determining the size of resistance conductor required, with reference to the amount of current that is passed through it, and the length of the resistance conductor with reference to the range over which it is desired to regulate the current, (less the maximum current that would flow if the rheostat were shunted out of circuit.) When the requirements of the rheostat have been thus determined, I wind the resistance conductor upon a mandrel or shaft, in the form of a closed spiral. In order to avail myself of the advantages of its length, it is necessary to separate the convolutions, which is accomplished by drawing out the spiral and forcing it to straddle the part that serves to retain the conductor in position spirally, and separated from the neighboring convolution, thereby insuring the passage of the electric current through the whole length of the conductor.

I have shown in the drawings accompanying this specification, a resistance conductor formed into a spiral, and the method of arranging it around the central hub.

By referring to the drawings and the description here given, my invention will be understood.

Figure 2:
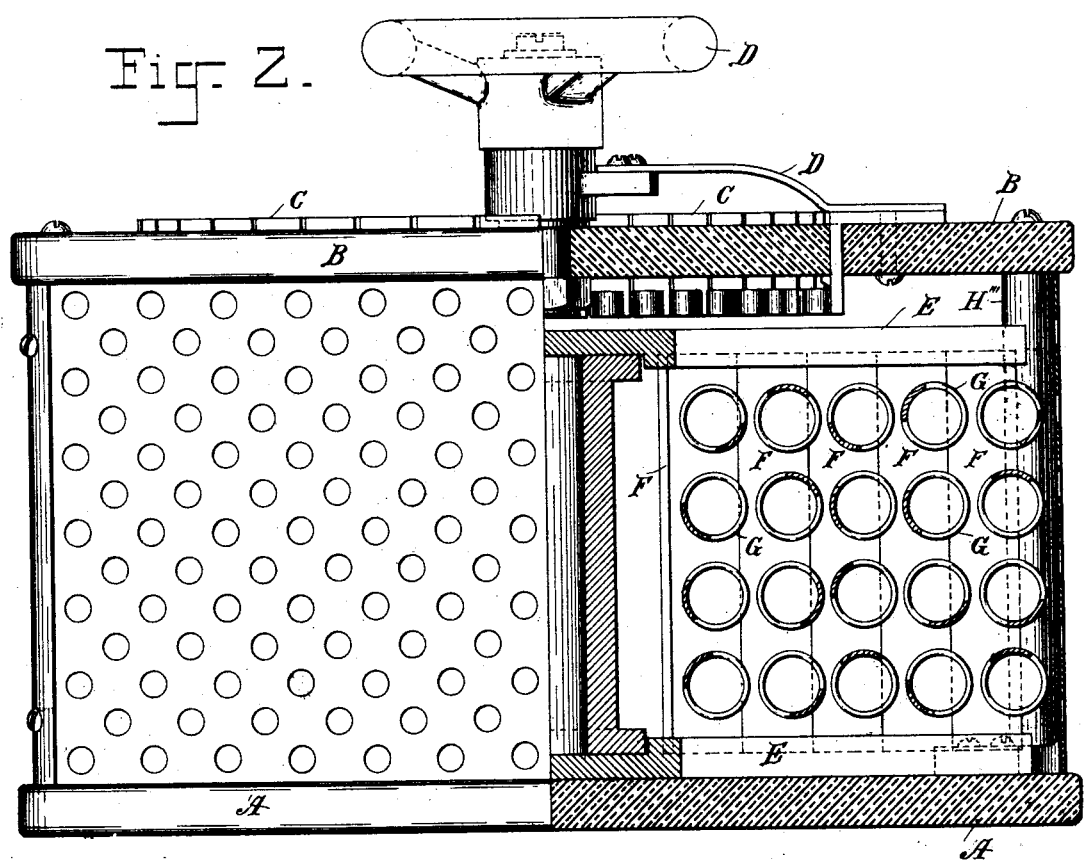

In the illustrations accompanying this specification, Figure 1 represents a plan view partially in section; Fig. 2 a side elevation, and Fig. 3 a portion of the spirally arranged resistance conductor and the leads connected to it.

Like letters of reference refer to like parts throughout.

In Fig. 1, A represents a plate or bed upon which is mounted the various parts; B, the upper plate, upon which is mounted the circle of segments C, the controlling device D, and the resilient arm that is united electrically in circuit with the source of current; E—E the radially grooved arms, which support the strip of hard insulating material, F—F; G the spirally formed resistance conductor arranged circumferentially around the central hub; H H' H'' H''', the standards which support the upper plate, and to which is secured the screen of perforated sheet iron that serves to inclose the various parts.

Fig. 2 shows similar parts having like letters of reference.

Figure 3:
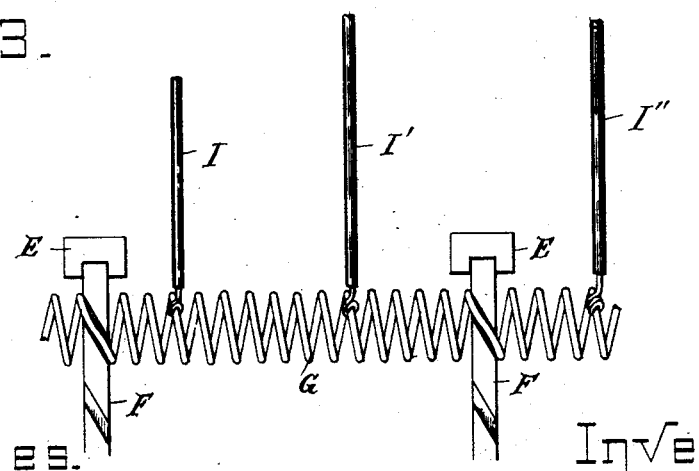

Fig. 3, G represents the spirally formed resistance conductor, and I I' I'', the leads electrically connected, that serve to unite the resistance conductor to the segment or segmental circle, over which travels the resilient arm that cuts in, a greater or less amount of resistance, according to the position at which it rests.

To facilitate the introduction of the resistance convolutes, the radial insulating plates are made in sections and the wires passed through between the sections as shown clearly in Figs. 1 and 2. The said wires as before stated are wound in tight spirals which are drawn apart and allowed to clamp the insulation plates between them.

Having thus described my invention, what I claim, and desire to secure by Letters Patent, is—

1. In a rheostat, the combination with series of radially arranged insulating supports, the series of stationary contacts and the movable contact adapted to cooperate therewith, of the series of resistance conductors formed into continuous spirals, carried by said radial insulating supports with leads connecting the stationary contacts and coils at intermediate points; substantially as described.

2. In a rheostat, the combination with the central member having the series of radial arms, the insulating supports carried by said arms, the stationary contacts and the movable contact for cooperation therewith, of the resistance conductor formed into a continuous spiral mounted on the insulating supports and the leads connecting the stationary contacts and resistance conductor at intermediate points; substantially as described.

3. In a rheostat, the combination with the series of radial arms, the insulating supports mounted on and carried thereby, the series of stationary contacts and the movable contact for cooperation therewith, of the series of resistance conductors formed into continuous spirals mounted on the insulating supports independently, and the leads connecting said stationary contacts and the spirals of the resistance conductors at intermediate points; substantially as described.

4. In a rheostat, the combination with the series of radial arms and sectional insulating supports carried thereby, of the convoluted resistance conductors passing through between the sections of the supports with leads and contacts for establishing the circuit through different portions of the conductor; substantially as described.

5. In a rheostat, the combination with the series of radial supports, of the resistance conductor formed into close coils and held in place by clamping the supports between the coils, contacts and leads for connecting the resistance conductor therewith; substantially as described.

6. In a rheostat, the combination with the series of sectional radially arranged insulating supports, of the series of spiral resistance conductors passing through between the sections of the supports and contacts and leads for establishing the circuit through any of said resistance conductors; substantially as described.

7. The combination with the series of pairs of grooved radial arms and the series of insulating supports mounted in said grooved arms, of the spiral resistance conductors passing successively through and carried by said insulating supports, stationary contacts with leads connecting the same and the insulating conductor at intermediate points and a movable contact for cooperation with the stationary contacts; substantially as described.

FRANKLIN A. WELLER.

Witnesses:
WALTER K. FREEMAN,
NELLIE A. MORGAN.